United States Patent
Justen

(10) Patent No.: US 11,628,335 B2
(45) Date of Patent: Apr. 18, 2023

(54) VIDEO ACOUSTICAL METHOD AND SYSTEM FOR DETERMINING AN IMPACT POINT OF A THROWN BODY ON A LANDING AREA

(71) Applicant: Swiss Timing Ltd, Corgemont (CH)

(72) Inventor: Benedikt Justen, Leipzig (DE)

(73) Assignee: Swiss Timing Ltd, Corgemont (CH)

( * ) Notice: Subject to any disclaimer, the term of this patent is extended or adjusted under 35 U.S.C. 154(b) by 268 days.

(21) Appl. No.: 16/599,456

(22) Filed: Oct. 11, 2019

(65) Prior Publication Data
US 2020/0114202 A1  Apr. 16, 2020

(30) Foreign Application Priority Data
Oct. 12, 2018 (EP) .................................. 18200236

(51) Int. Cl.
| A63B 24/00 | (2006.01) |
| A63B 71/06 | (2006.01) |
| G04F 10/00 | (2006.01) |

(52) U.S. Cl.
CPC ...... *A63B 24/0021* (2013.01); *A63B 71/0605* (2013.01); *G04F 10/00* (2013.01);
(Continued)

(58) Field of Classification Search
CPC ............ A63B 24/0021; A63B 71/0605; A63B 2024/0034; A63B 2024/0037;
(Continued)

(56) References Cited

U.S. PATENT DOCUMENTS

2001/0048754 A1* 12/2001 Antonio ............. A63B 24/0021
                                                                    382/106
2019/0366187 A1* 12/2019 Gódor ................ A63B 71/0605

FOREIGN PATENT DOCUMENTS

| EP | 1 1 58 270 A1 | 11/2001 |
| GB | 2 403 362 A | 12/2004 |

(Continued)

OTHER PUBLICATIONS https://courses.lumenlearning.com/physics/chapter/2-3-time-velocity-and-speed/, www.lumen.com (Year: 2014).*
(Continued)

*Primary Examiner* — Jeffrey S Vanderveen
(74) *Attorney, Agent, or Firm* — Oblon, McClelland, Maier & Neustadt, L.L.P.

(57) ABSTRACT

A video acoustical method determines an impact point of a thrown body on a landing area, in particular for athletics throws disciplines, the body describing a trajectory in the air from a take-off area towards the landing area, the impact point being defined by the body hitting on the landing area. The method includes acquiring video exposures of the body impact on the landing area to a frame rate, each exposure showing one position of the body; calculating the body trajectory during at least the body impact on the landing area with the video exposures analysis; detecting an acoustical impact time due to the body hitting on the landing area; and determining the body impact point on the calculated trajectory with the detected acoustical impact time. A video acoustical system can determine an impact point of a thrown body on a landing area.

11 Claims, 3 Drawing Sheets

(52) U.S. Cl.
CPC .......... *A63B 2024/0034* (2013.01); *A63B 2024/0037* (2013.01); *A63B 2220/05* (2013.01); *A63B 2220/20* (2013.01); *A63B 2220/806* (2013.01); *A63B 2220/808* (2013.01); *A63B 2244/14* (2013.01); *A63B 2244/15* (2013.01); *A63B 2244/16* (2013.01); *A63B 2244/17* (2013.01)

(58) Field of Classification Search
CPC .......... A63B 2220/05; A63B 2220/20; A63B 2220/806; A63B 2220/808; A63B 2244/14; A63B 2244/15; A63B 2244/16; A63B 2244/17; G04F 10/00; G01B 11/002; G01B 5/0023
See application file for complete search history.

(56) References Cited

FOREIGN PATENT DOCUMENTS

| | | | | |
|---|---|---|---|---|
| GB | 2403362 A | * | 12/2004 | ......... A63B 71/0605 |
| JP | 08-11 7381 A | | 5/1996 | |

OTHER PUBLICATIONS

European Search Report dated Feb. 22, 2019 in European Application 18200236.0 filed on Oct. 12, 2018 (with Written Opinion).

* cited by examiner

VIDEO ACOUSTICAL METHOD AND SYSTEM FOR DETERMINING AN IMPACT POINT OF A THROWN BODY ON A LANDING AREA

CROSS-REFERENCE TO RELATED APPLICATION

This application claims priority to European Patent Application No. 18200236.0 filed on Oct. 12, 2018, the entire disclosure of which is hereby incorporated herein by reference.

TECHNICAL FIELD

The invention relates to the field of video acoustical method for determining an impact point of a thrown body on a landing area, in particular for athletics throws disciplines. The invention also relates to video acoustical system for determining an impact point of a thrown body on a landing area.

BACKGROUND OF THE INVENTION

Nowadays, we can see evolutions in many sports towards the use of new video technologies to help sport referees for judgement or to increase the speed of sports event in displaying results.

For example, in the field of measurement systems, video is used in football to measure the distance between a ball and a goal, in order to display the distance on a screen. Another scope of video distance measurement use is in athletics throw disciplines like javelin, shot put, hammer or discus throws. Since the time that digital cameras have reached sufficient spatial resolution, they are used to observe and analyze the trajectory of flying bodies to determine the exact landing area, as described in document EP1158270 for example. After the body has landed, the distance between the point of impact and the take-off is measured to determine the propelled distance for the body and suitably display it on an appropriate known display unit.

Nevertheless, the demands on the accuracy of the system are very high in this domain. Usually, the horizontally travelled distance has to be measured with an accuracy of 1 cm or less. But the spatial resolution of the image of the landing area is only one factor assuring the final accuracy of the complete measurement chain. A second factor is the temporal resolution of the cameras. Normal video frame rates are about thirty or forty exposures per second, so it is difficult to capture the exact moment of the body impact on the landing area. Measuring the distance of the athletes attempt at the first image where the body is clearly touching the ground is an error, because this is not representing the position where it first touched the ground in reality. Between two exposures, the body travels easily at least thirty centimetre. This corresponds to a temporal accuracy of thirty centimetre. So it is not easy to derive an exact impact point from video exposures. Additionally we cannot always identify an impact crater to measure the thrown distance, because the grass often obstructs the view to it.

SUMMARY OF THE INVENTION

The object of the invention is to present a method for determining precisely an impact point of a thrown body on a landing area by means of video exposures acquisition of the impact.

Thus, the invention concerns a method for determining an impact point of a thrown body on a landing area, in particular for athletics throws disciplines, the body describing a trajectory in the air from a take-off area towards the landing area, the impact point being defined by the body hitting on the landing area, the method comprising an acquisition step of video exposures of the body impact on the landing area to a frame rate, each exposure showing one position of the body.

According to the invention, the method further comprises:
- a calculation step of the body trajectory during at least the body impact on the landing area by means of the video exposures analysis,
- a detection step of an acoustical impact time due to the body hitting on the landing area, and
- a determining step of the body impact point on the calculated trajectory by means of the detected acoustical impact time.

The proposed method has the advantage to combine video acquisition and sound detection in order to reach an accurate determining of the body impact on video exposures. Cameras are only used to measure the flight path and the speed of the body, while the acoustical impact detection allow to determine accurately the impact point where the body hits the ground of the landing area. This method detects the impact time acoustically and use this information to localize the impact point on the trajectory.

To derive the actual impact point, we use the knowledge of the trajectory and an additional acoustical measurement system that can be operated with a much higher temporal resolution than image acquisition could. The standard data acquisition rate of an acoustical systems is at least two orders higher than a whole video based technology.

The method requires fewer data amount and computer power, the employ of standard cameras to standard frame rate, as well as standard microphones. Consequently, such method requires cheaper system than high exposure cameras system, and is easy to use for all sports thrown disciplines.

Furthermore, the method according to the invention may comprise one or a combination of the following characteristics.

According to a not-limited embodiment, the determining step comprises a selection of a first exposure preceding the acoustical impact time, the first exposure defining a first position of the body on the calculated trajectory.

According to a not-limited embodiment, the selected exposure is the last acquired exposure preceding the detected acoustical impact time.

According to a not-limited embodiment, the determining step comprises the calculation of the body speed at the defined position of the body.

According to a not-limited embodiment, the speed of the body is calculated on account of the first selected exposure and a second selected exposure preceding the first selected exposure, the second selected exposure defining a second position $L_1$ of the body on the calculated trajectory.

According to a not-limited embodiment, the second exposure is the last acquired exposure preceding the first selected exposure.

According to a not-limited embodiment, the speed S is calculated between the first and second positions $L_1$, $L_2$ thanks to the following equation:

$$S = \frac{(L_2 - L_1)}{(T_2 - T_1)},$$

where $T_1$, $T_2$ are the times of the first and the second exposure acquisition.

According to a not-limited embodiment, the determining step comprises a measure of the length time $\Delta T$ from the time of the first selected exposure acquisition $T_2$ until the detected acoustical impact time $T_{imp}$, where $\Delta T=(T_{imp}-T_2)$.

According to a not-limited embodiment, the impact point is derived thanks to the following equation: $\Delta L=\Delta T*S$, where $\Delta L$ is the length starting from the position $L_2$ until the impact point $L_{imp}$ on the calculated trajectory.

According to a not-limited embodiment, the acoustical detection step is operated through ground waves detection.

According to a not-limited embodiment, the acoustical detection step is operated through air waves detection.

According to a not-limited embodiment, the method further comprises a measuring step of the distance on the ground of the body throw from the take-off area to the determined impact point.

According to a not-limited embodiment, the method comprises a display step of at least one image of the impact point, the measured distance is preferably also displayed on the image during the display step.

Another object of the invention is to provide a system to carry out this method into effect.

Thus, the invention also concerns a video acoustical system for determining an impact point of a thrown body on a landing area, in particular for athletics throws disciplines, the body describing a trajectory in the air from a take-off area towards the landing area, the impact point being defined by the body hitting on the landing area. The system comprises acquisition means having at least a video camera to acquire video exposures of the body impact on the landing area to a frame rate.

The system further comprises:
detection means having at least one microphone to detect an acoustical impact due to the body hitting on the landing area,
calculation means to calculate the body trajectory during the body impact on the landing area by means of the video exposures analysis, and
determining means to determine the body impact point on the calculated trajectory by means of the detected acoustical impact time.

Furthermore, the system according to the invention may comprise one or a combination of the following characteristics.

According to a not-limited embodiment, the system further comprises measuring means to measure the distance on the ground of the body throw from the take-off area to the determined impact point.

According to a not-limited embodiment, the detection means comprises at least two microphones, preferably four microphones, arranged around the landing area.

According to a not-limited embodiment, the microphone(s) is arranged on the ground to detect sound waves travelling through the ground.

According to a not-limited embodiment, the microphone(s) is arranged on the ground to detect sound waves travelling in air.

BRIEF DESCRIPTION OF THE DRAWINGS

The present invention will be apparent more clearly to those skilled in the art by reading the following description with reference to the attached drawings.

In the drawings.

DETAILED DESCRIPTION OF EMBODIMENTS OF THE INVENTION

The method is implemented by means of a video acoustical system having at least a video camera. An embodiment of such system is more precisely described later in the description. The objective of the method is to provide the actual video impact point of a thrown body on a landing area, in particular for athletics throws disciplines.

Figure 1:
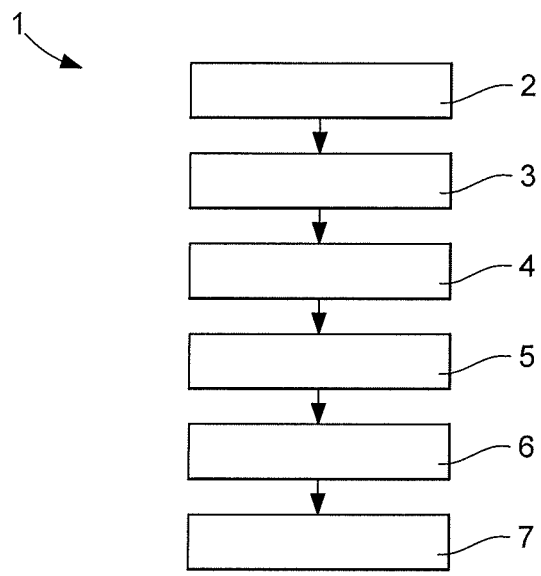
FIG. 1 is a diagram illustrating the method according to the invention.

FIG. 1 shows a diagram of a video acoustical method 1 for determining an impact point of a thrown body on a landing area, in particular for athletics throws disciplines. A body is for example a discus, a javelin, a shot or a hammer or other body that can be thrown in sports. The body describes a trajectory in the air from a take-off area towards a landing area, the impact point being defined by the body hitting on the landing area. The method 1 enables to define with accuracy the impact point on the landing area thanks to image analysis and sound detection, in order, for example, to measure the length distance of the throw.

The method comprises a first step, designated acquisition step 2, to acquire video exposures of the body impact on the landing area. Video exposures are preferably acquired by a video camera. Each exposure of the video shows one body position of the body trajectory.

The method further comprises a second step, designated calculation step 3, to calculate the body trajectory during at least the body impact on the landing area. This goal is reached by means of the body positons recorded on the acquired exposures that allow to calculate the trajectory followed by the body during the impact on the landing area. For that purpose, the method uses image analysis software to determine the body positions on each exposure relating to the landing area. The landing area and the space above the landing area are divided into small sectors that are recognized by the software. Each exposure gives a position of the body in this space, so that it is possible to reconstruct the body trajectory until the landing area. It is possible to determine the body impact point only from a part of the trajectory, preferably a narrow time preceding the impact time.

According to the invention showed on FIG. 1, the method comprises a third step, designated detection step 4, to detect an acoustical impact time. Indeed, when the body hits the ground of the landing area, the impact produces sound waves in all directions around the impact point. Sound waves are air waves when propagate into the air, and ground waves when propagate into the ground. According to the invention, these waves are detected to determine the actual time of the impact body on the ground. Ground waves are preferably detected because ground waves are faster than air waves, as well as to avoid interferences air waves from other sources. Nevertheless, in another embodiment, the method works also well using air waves detection. The time related to the sound detection is stored to be used in a further step of the method. Thanks to the detected impact time, it is possible to know exactly which position on the trajectory of the body is the actual impact point on the landing area.

The method comprises a fourth step, designated determining step 5, to determine the body impact point on the calculated trajectory. The determining step comprises a calculation of the speed of the body before the impact point. The impact point is determined by means of the detected acoustical impact time, the speed of the body and the calculated trajectory of the calculation step 3.

For that purpose, a first exposure preceding the body impact is selected to start from a body position at a given time. Preferably, the last acquired exposure preceding the impact is selected in order to start from the closer position of the body to the impact point on the ground. Then, the length time from the time of the first selected exposure until the detected acoustical impact time is measured. In that way, the camera time base and the sound detecting time are synchronized. Starting from the selected exposure, and thanks to the measured length time and the body speed, the actual body impact point is derived on the calculated body trajectory.

According to an embodiment of FIG. 1, the method further comprises a fifth step, designated measuring step 6, to measure the ground distance of the body throw from the take-off area to the determined impact point. This step is also fulfilled with an image analysis software thanks to landmarks arranged on the landing area.

According to an embodiment of FIG. 1, the method further comprises a sixth step, designated display step 7, to display at least one image showing the determined impact point. The measured distance is advantageously also displayed on the image during the display step 7.

Figure 2:
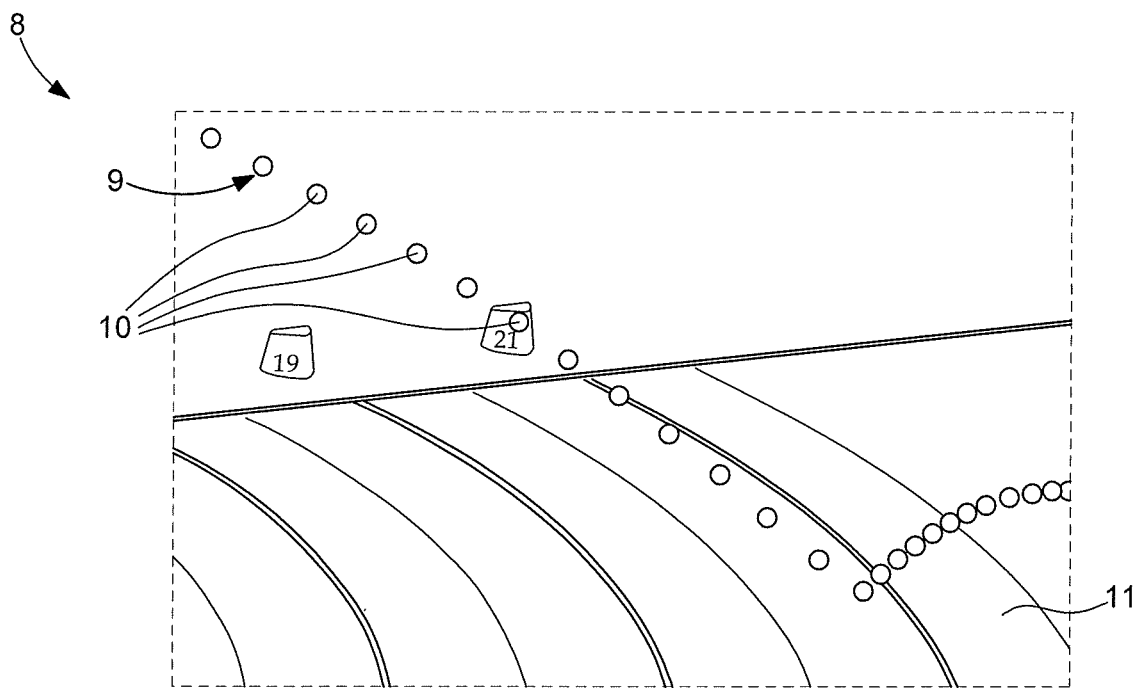
FIG. 2 illustrates an example of video acquired exposures of a body trajectory and impact on the landing area.

In order to illustrate the method, an example of acquired images for a body trajectory is shown on FIG. 2. The body 9 is a shot put. FIG. 2 is an image 8 showing a combination of exposures recorded by a camera before, during, and after the impact on a landing area 11. The figure shows a set of successive body positions 10, each position 10 is given by an exposure. Successive exposures gives the trajectory followed by the shot. Exposures are periodically acquired according to the frame rate f of the camera, for example thirty or forty exposures per seconds. It is of course possible to use cameras having higher frame rate. Consequently, the time between two successive positions of the body 9 is $$T = \frac{1}{f},$$

thus twenty-five to thirty-three milliseconds in this example. The image 8 shows several positions of the shot trajectory in the air, during the impact, and during the rebound after the impact. Thanks to these positions, the image analysis software is able to calculate the trajectory of the body 9 during the calculation step.

Figure 3:
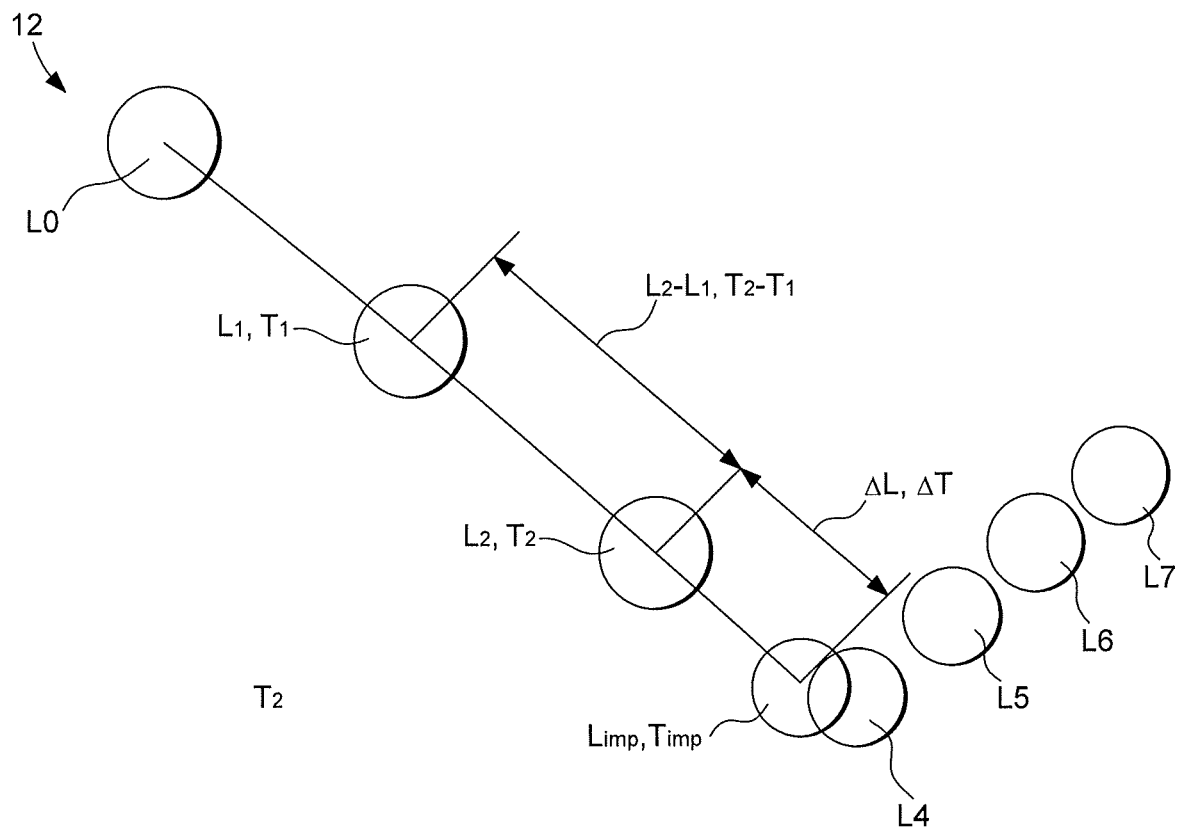
FIG. 3 shows how the impact point is derived from the trajectory according to the invention method.

FIG. 3 is an image 12 showing how the impact point is determined during the determining step. The image 12 is a focus combination of acquired exposures from a time just before the impact until a time just after the impact. The image shows three positions $L_0, L_1, L_2$ preceding the impact, one position $L_4$ touching the ground during the impact, and three positions $L_5, L_6, L_7$ during the shot rebound after the impact. Each position is given by an exposure acquired by a camera. Here, the first selected position is $L_2$ because it is the last acquired position The speed S of the shot is calculated on account of the first selected exposure and a second selected exposure preceding the first selected exposure. Preferably, the second selected exposure is the last acquired exposure preceding the first selected exposure in order to calculate the speed closer to the impact point. The second selected exposure defines a second position of the body on the calculated trajectory, here is $L_1$.

Thus, both selected exposures defines two positions $L_1$, $L_2$ of the body preceding the impact point. The speed is calculated between the two positions thanks to the following equation:

$$S = \frac{(L_2 - L_1)}{(T_2 - T_1)},$$

where $T_1$, $T_2$ are the times when the first and the second exposure were acquired. Since exposures are periodically acquired following a definite frame rate, the time between the two exposures $(T_2-T_1)$ is inversely proportional to the frame rate. For example, if the selected exposures are successive, $$(T_2 - T_1) = \frac{1}{f},$$

where f is the frame rate.

Then the length time $\Delta T$ from the time of the first selected exposure acquisition $T_2$ until the detected acoustical impact time $T_{imp}$ is measured, following the equation $\Delta T=(T_{imp}-T_2)$. The impact point is then calculated according to the measured length time and the calculated speed starting from the last position of the body. The impact point is derived thanks to the following equation: $\Delta L=\Delta T*S$, where $\Delta L$ is the length starting from the position $L_2$ until the impact point $L_{imp}$ on the calculated trajectory of the shot. We understand on FIG. 3 that the actual impact point $L_{imp}$ comes earlier than the position $L_4$ touching the ground, meaning that $L_4$ is the end of the shot on the ground. The method according to the invention gives better results to determine the impact point than video analysis without acoustical detection. This result is achieved thanks to the the higher resolution time of the acoustical detection.

The invention also relates to a video acoustical system 15 for determining an impact point of a thrown body on a landing area, in particular for athletics throws disciplines. The system 15 is configured to implement the method described previously in order to provide an accurate position of the body impact on the landing area.

Figure 4:
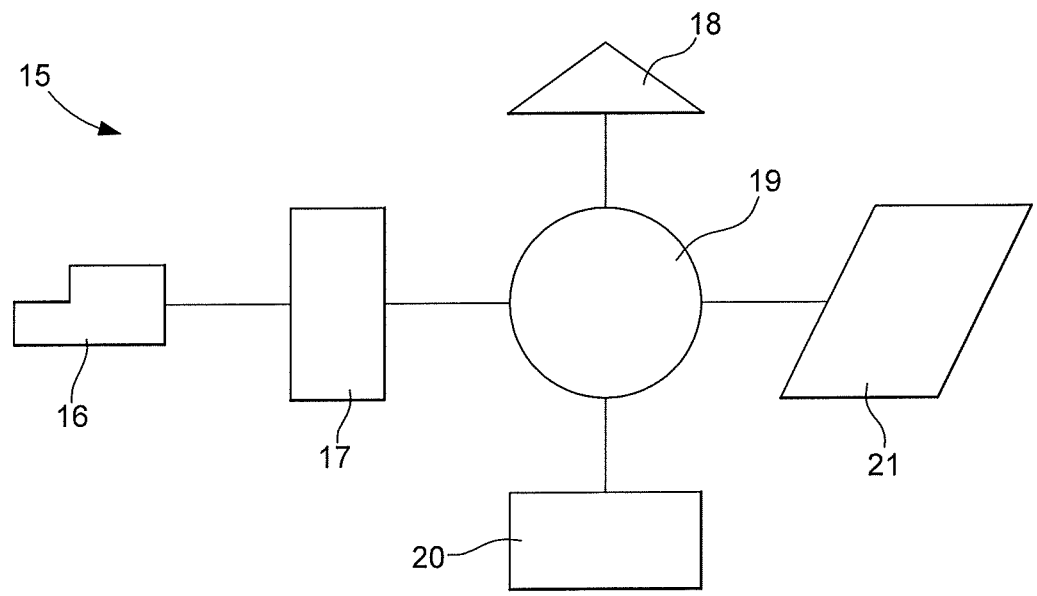
FIG. 4 is a schematic example of a video acoustical system according to the invention.

As shown on FIG. 4, the system comprises acquisition means 16 having at least a video camera to acquire video exposures of the body impact on the landing area. The camera is for example, a standard camera operating through standard frame rate, as thirty or forty images per seconds.

The system 15 further comprises calculation means 17 to calculate the body trajectory during the body impact on the landing area by means of the video exposures analysis. Calculation means 17 are connected to the acquisition means 16 to receive the exposure data from the camera. The calculation means 17 are for example a computer having an image analysis software configured to calculate the body trajectory during the impact. Advantageously, the calculation means 17 are configured to calculate the trajectory during at least a part of the trajectory preceding the impact time.

The system 15 further comprises detection means 18 to detect an acoustical impact due to the body hitting on the landing area. The detection means 18 comprises at least two microphones, preferably four microphones, arranged around the landing area. The detection means 18 preferably deliver a detection warning to store instantaneously the time of the impact. The impact time is calculated from the wave detection warning of each of the microphones and thanks to the positions or distance between the microphones and the average velocity of the wave propagating in the ground or in air. The system 15 is previously calibrated in that way to obtain the real impact time.

The system 15 further comprises determining means 19 to determine the body impact point on the calculated trajectory by means of the detected acoustical impact time. The determining means 19 receive the calculated trajectory of the body from the calculation means 17, the detection warning from the detection means 18. The determination means 19 has a chronometric device to measure the acoustical impact time corresponding to the detection warning. By use of the method described previously, the determining means 19 determine the impact point of the body on the landing area.

The system 15 further comprises measuring means 20 to measure the distance on the ground of the body throw from the take-off area to the determined impact point. The measuring means are for example an image analysis software unit configured to measure said distance. The impact point is given to the measuring means 20 by the determining means 19. The distance is measured thanks to the landmarks on the landing area ground.

The system 15 further comprises display means 21 to display an image of the landing area showing the impact point. Preferably, the display means 21 display the distance measured by the measuring means 20. For that goal, the measuring means 20 transfer the measured distance to the display means 21.

Figure 5:
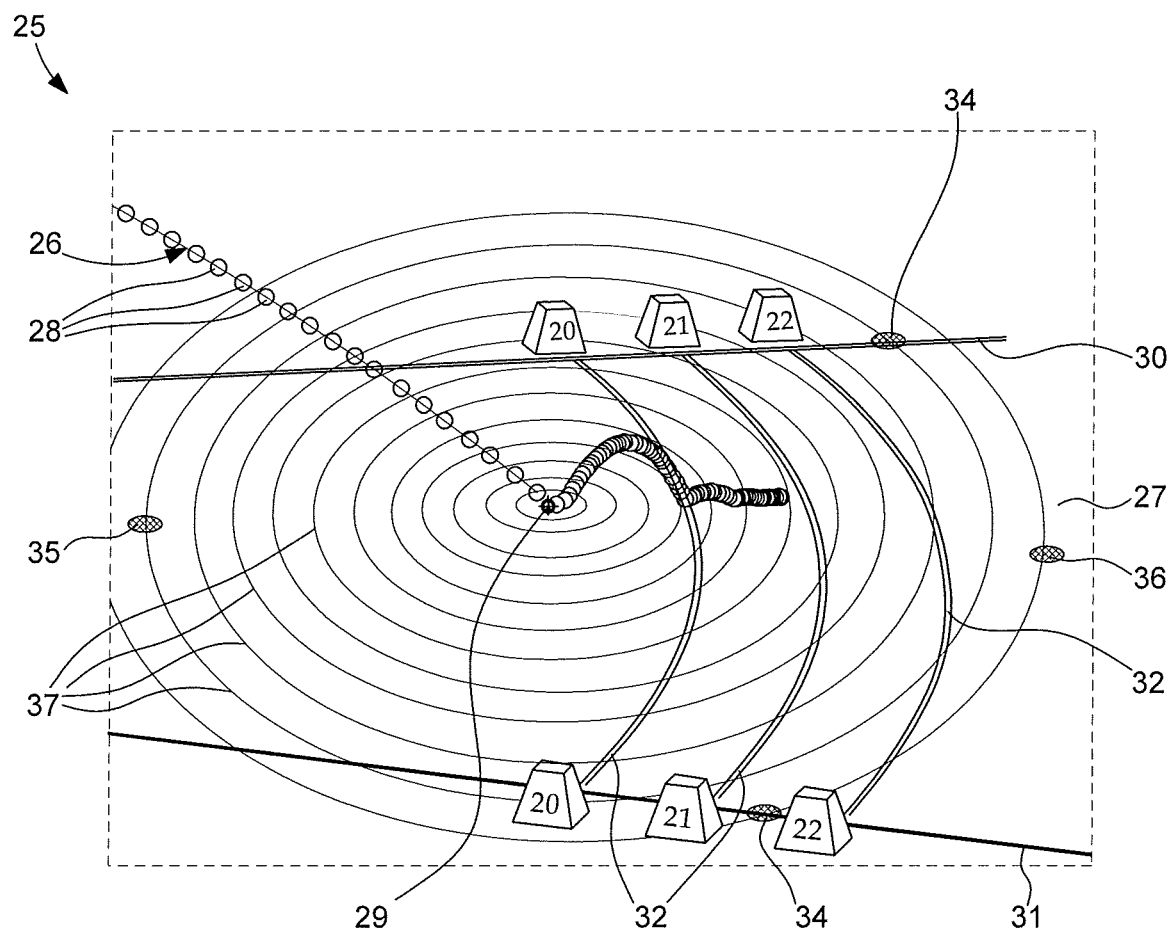
FIG. 5 is an example of microphones arrangement on the ground of a landing area and acoustical detection.

FIG. 5 is a combination on a single image 25 of exposures acquired by a camera. The body 26, here a shot, describes a trajectory in the air above the landing area 27, hits the landing area 27, and rebounds after the impact. The figure shows a set of successive body positions 28 defining the body trajectory. The camera is arranged to focus on the landing area 27, and is able to acquire exposures of the thrown body in the air above the landing area 27, during the impact 29 on the landing area, and after the impact 29. The camera is preferably arranged on the side of the landing area 27 relating to the throw direction, and is directed towards the landing area from an upper view. On both sides of the landing area 27, lines 30, 31 delimit the allowed part of landing area 27 for the body impact 29, and measure landmarks are arranged on the landing area to see where the body hits the ground. The landmarks are curved lines 32 crossing the landing area 27 from a side line to the other, each curved line 32 defining a measured length.

In another embodiment, the system comprise a set of cameras arranged around the landing area in order to obtain a better resolution and accurate calculation of the body trajectory.

On FIG. 5, four microphones are arranged on the landing area, one microphone 34 on each side line 30, 31, one microphone 35 at the beginning of the landing area 27 relating to the take-off area, and one microphone 36 beyond the landmarks 32 at the end of the landing area 27. Consequently, when the body 26 hits the landing area 27, sound waves 37 travelled through the ground all around the body impact 29, and reach the microphones 34, 35, 36. Several microphones gives a better guarantee to detect the actual impact time than only one microphone. Each microphone 34, 35, 36 send a detection warning to the determining means, not shown on the figure, that store the impact time corresponding to the detection time.

The present invention is not limited to the above described embodiments. Various alternatives, modifications and equivalents may be used. Therefore, the description above is not to be taken as limiting the scope of the present invention, which is defined by the attached claims.

The invention claimed is:

1. A video acoustical method for determining an impact point of a thrown body on a landing area, the body traversing a trajectory in the air from a take-off area towards the landing area, the impact point being defined by the body hitting on the landing area, the method comprising:
   acquiring video exposures of the body before and after impact of the body on the landing area at a predetermined frame rate, each exposure showing one position of the body,
   calculating the trajectory of the body during at least the impact of the body on the landing area by analyzing the acquired video exposures,
   detecting, from acoustic measurements, an acoustical impact time at which the body impacts the landing area,
   selecting a first exposure, of the acquired video exposures, immediately preceding the detected acoustical impact time, the first exposure being acquired at a first exposure acquisition time and defining a first position of the body on the calculated trajectory,
   determining the impact point of the body along the calculated trajectory using a calculated difference between the detected acoustical impact time and the first selected exposure acquisition time, and
   displaying an image of the determined impact point,
   wherein the method further comprises
      calculating a speed of the body at the defined first position based on the first selected exposure and a second selected exposure acquired at a second exposure acquisition time preceding the first exposure acquisition time, which precedes the acoustical impact time, the second selected exposure defining a second position of the body along the calculated trajectory so that the speed is calculated from only the first and second exposures, both having exposure acquisition times prior to the impact of the body on the landing area, and
      determining the body impact point based on the calculated speed.

2. The video acoustical method according to claim 1, wherein the second exposure is a last acquired exposure immediately preceding the first selected exposure.

3. The video acoustical method according to claim 1, wherein the calculating step further comprises calculating the speed of the body at the defined first position according to:

$$S = \frac{(L_2 - L_1)}{(T_2 - T_1)},$$

where $T_1$, $T_2$ are the second exposure acquisition time and the first selected exposure acquisition time, respectively, and $L_1$, $L_2$ are the second and first positions, respectively.

4. The video acoustical method according to claim 1, wherein the determining step comprises determining the impact point according to: ΔL=ΔT*S, where ΔL is a length from the first position to the impact point on the calculated trajectory and ΔT is the calculated difference.

5. The video acoustical method according to claim 1, wherein the detecting step further comprises detecting the acoustic impact time by detecting ground waves.

6. The video acoustical method according to claim 1, wherein the detecting step further comprises detecting the acoustic impact time by detecting air waves.

7. The video acoustical method according to claim 1, wherein the method further comprises measuring a distance on the ground from the take-off area to the determined impact point.

8. The video acoustical system for determining an impact point of a thrown body on a landing area, the body traversing a trajectory in the air from a take-off area towards the landing area, the impact point being defined by the body hitting on the landing area, the system comprising:
   acquisition means having at least a video camera to acquire video exposures of the body before and after impact of the body on the landing area at a predetermined frame rate,
   detection means including at least one microphone to detect an acoustical impact time at which the body impacts the landing area, and
   processing circuitry configured to
      calculate the trajectory of the body during the impact of the body on the landing area by analyzing the acquired video exposures,
      select a first exposure, of the acquired video exposures, immediately preceding the detected acoustical impact time, the first exposure being acquired at a first exposure acquisition time preceding the detected acoustic impact time and defining a first position of the body on the calculated trajectory,
      determine the impact point of the body along the calculated trajectory using a calculated difference between the detected acoustical impact time and the first selected exposure acquisition time, and
      display an image of the determined impact point,
   wherein the processing circuitry is further configured to
      calculate a speed of the body at the defined first position based on the first selected exposure and a second selected exposure acquired at a second exposure acquisition time preceding the first exposure acquisition time, which precedes the acoustical impact time, the second selected exposure defining a second position of the body along the calculated trajectory so that the speed is calculated from only the first and second exposures, both having exposure acquisition times prior to the impact of the body on the landing area, and
      determine the body impact point based on the calculated speed.

9. The video acoustical system according to claim 8, wherein the detection means comprise at least two microphones arranged around the landing area.

10. The video acoustical system according to claim 8, wherein the at least one microphone is arranged on the ground to detect sound waves travelling through the ground or in air.

11. The video acoustical system according to claim 8, wherein the processing circuitry is further configured to measure a distance on the ground from the take-off area to the determined impact point.

* * * * *